Figures 1, 2:
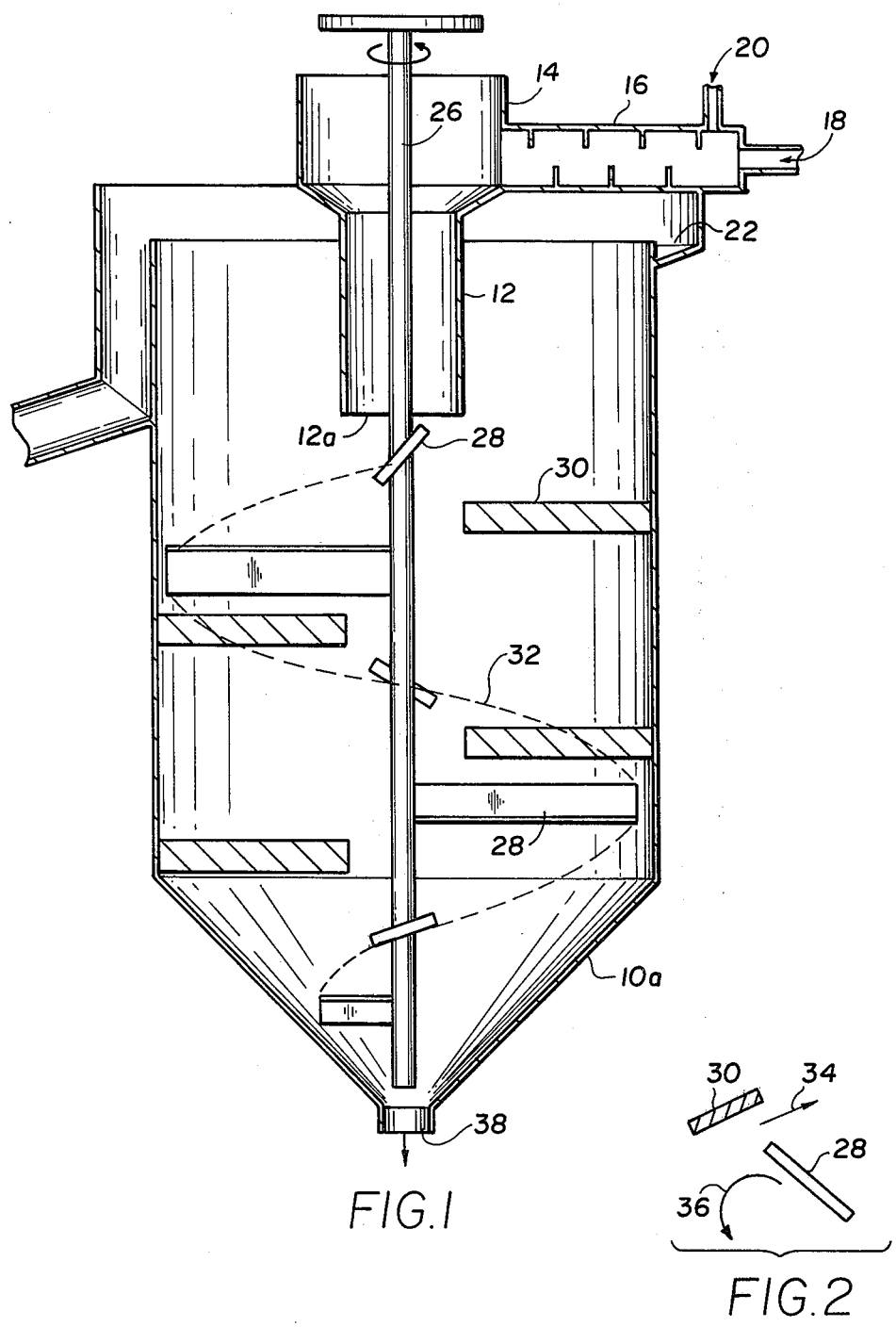

United States Patent [19]

Lafosse et al.

[11] 4,347,135

[45] Aug. 31, 1982

[54] APPARATUS FOR SUPERFLOCCULATING AND THICKENING A SLUDGE

[75] Inventors: Jean R. M. Lafosse; Bernard J. Robert, both of Avon, France

[73] Assignee: Fives-Cail Babcock, Paris, France

[21] Appl. No.: 934,995

[22] Filed: Aug. 18, 1978

[30] Foreign Application Priority Data

Aug. 23, 1977 [FR] France ............................. 77 25647

[51] Int. Cl.³ .............................................. C02F 1/52
[52] U.S. Cl. .................................. 210/208; 210/219; 210/512.1; 366/307
[58] Field of Search ............... 210/206, 207, 208, 219, 210/512 R; 366/302, 303, 304, 307

[56] References Cited

U.S. PATENT DOCUMENTS

| | | | |
|---|---|---|---|
| 1,932,531 | 10/1933 | Parker | 210/206 X |
| 2,348,122 | 5/1944 | Green | 210/208 X |
| 2,405,315 | 8/1946 | McBride | 210/208 X |
| 2,528,094 | 10/1950 | Walker | 210/207 X |
| 3,709,664 | 1/1973 | Krekeler et al. | 366/307 X |
| 3,923,652 | 12/1975 | Condolios et al. | 210/208 X |
| 3,938,783 | 2/1976 | Porter | 366/307 X |

FOREIGN PATENT DOCUMENTS

663623 8/1938 Fed. Rep. of Germany ...... 210/208
577517 5/1946 United Kingdom ................ 210/219

Primary Examiner—Robert H. Spitzer
Attorney, Agent, or Firm—Kurt Kelman

[57] ABSTRACT

A thickening apparatus comprises a cylindrical vessel, an axially extending delivery conduit having an outlet in the upper third part of the vessel, a mixer feeding sludge and a flocculating agent to the delivery conduit whereby the sludge and flocculating agent mixture is delivered into the vessel through the delivery conduit outlet, a collecting basin discharging liquid removed from the mixture peripherally of the vessel at the upper part thereof, a vertical rotary shaft extending through the vessel, vanes mounted on the rotary shaft, counter-vanes arranged in the vessel to cooperate with the vanes, the vanes and counter-vanes extending in opposite inclined planes and the vanes forming a discontinuous helix extending from the upper to the lower part of the vessel, the pitch of the helix diminishing towards the lower part, and a discharge conduit for the thickened sludge in the lower part of the vessel.

8 Claims, 2 Drawing Figures

APPARATUS FOR SUPERFLOCCULATING AND THICKENING A SLUDGE

The present invention relates to an apparatus for superflocculating and thickening a sludge which may have been prethickened by any suitable process, the apparatus permitting to obtain, after superflocculation with a flocculating agent suitable for the specific product, a thickening and an agglomeration of the flocculated products while the accompanying liquid, such as water, is removed.

In many industries, finely comminuted solids must be separated from a liquid in which the solids are suspended. Various techniques have been proposed to solve the various problems encountered in such separation processes, based on centrifuging, filtering or sedimentation, among the most common techniques. Among these techniques, sedimentation is the least expensive and since synthetic flocculants have become readily available, it has proved to be more and more efficient and adapted to a variety of products, achieving good results even in cases of treating solid products which, due to their very fine granulation or other properties, are very difficult to decant.

However, in conventional chemical decanting apparatus, the removed sludge still has a water content which is too high for ready use and must be subjected to further costly treatments or placed into basins, representing a loss of time and water. Water is becoming a scarce commodity, particularly but not exclusively in desert areas which hold mineral extraction and processing installations, and it is, therefore, important to concentrate the sludge to the maximum.

For this reason, it has become desirable to operate more efficient thickeners. In this connection, it has been proposed to combine a primary and secondary flocculation with the recycling of the flocculated sludge. Cylindrical thickeners with conical bottoms of great height and small diameter, with a rotary stirring device in the conical part, have also been proposed, as well as apparatus combining stirrers with vanes in their upper part and a screw in the lower part.

In the first type of apparatus, flocculation is very efficient but the obtained agglomerates are too bulky and contain a considerable amount of water. In the second type of apparatus, the slow stirring devices improve the agglomeration of the sludge but they are less efficient because the sludge has a tendency to be entrained by the stirring device so that the entire mass is turned at the same time so that there is no stirring to permit liberation of the water entrapped between the agglomerates.

The superflocculating the thickening apparatus of this invention removes these disadvantages because it is based at the same time on the superflocculation of prethickened sludges and the slow stirring or shearing between vanes and counter-vanes of the thickened mass to permit an efficient liberation of the water entrained by the agglomerates, which is further improved by the specific arrangement of these vanes and counter-vanes.

The apparatus of the invention comprises a cylindrical vessel having an upper part and a lower part, an axially extending delivery conduit having an outlet in the upper third part of the vessel, means for feeding a mixture of the sludge and of a flocculating agent to the delivery conduit whereby the mixture is delivered into the vessel through the delivery conduit outlet, and means for collecting liquid removed from the mixture delivered into the vessel and for discharging the removed liquid peripherally of the vessel at the upper part thereof. A vertical rotary shaft extends through the vessel, vanes are mounted on the rotary shaft for rotation therewith and counter-vanes are arranged in the vessel to cooperate with the vanes. The vanes and counter-vanes extend in substantially radial planes and are inclined with respect to each other, the inclinations of cooperating vanes and counter-vanes being in opposite directions, the vanes forming a discontinuous helix extending from the upper to the lower part of the vessel and the pitch of the helix diminishing towards the lower part of the vessel. A discharge conduit for the thickened sludge is disposed in the lower part of the vessel.

The above and other objects, advantages and features of the present invention will become more apparent from the following detailed description of a now preferred embodiment thereof, taken in conjunction with the accompanying schematic drawing wherein FIG. 1 shows the superflocculating the thickening apparatus and FIG. 2 illustrates the separation of water and sludge.

Referring now to the drawing, the apparatus is shown to comprise cylindrical vessel 10 having a conical bottom 10a although the vessel could be formed with a flat bottom. Axially extending delivery conduit 12 has an outlet 12a in the upper third part of the vessel and this conduit has an upstream enlarged portion 14 outside vessel 10. Means 16 for feeding a mixture of the sludge and of a flocculating agent is illustrated as a mixing device tangentially connected to delivery conduit 12 at the enlarge portion thereof, the mixing device including inlet 18 for pre-thickened sludge and inlet 20 for the flocculating agent. Such mixing devices may incorporate a screw conveyor and are well known per se, the mixture of pre-thickened sludge and flocculating agent being fed to delivery conduit 12 whence it flows into the vessel through outlet 12a.

The clarified water removed from the mixture delivered into the vessel and rising to the upper part thereof is collected in means 22 and discharged peripherally of the vessel through discharge conduit 24.

Vertical rotary shaft 26 extends through the vessel along its entire height and vanes 28 are mounted on the rotary shaft for rotation therewith. The vanes are inclined with respect to the horizontal, the angles of inclination being from 60° to 40°, preferably about 45°, in the upper part of the vessel and from 30° to 10°, preferably about 20°, in the lower part of the vessel. The vanes form a discontinuous helix extending from the upper to the lower part of the vessel, the path of this helix being indicated by broken line 32, and the pitch of the helix diminishes towards the lower part of the vessel. The vanes may be mounted directly on the rotary shaft or they may be supported on helically disposed arms on the shaft. The discontinuous helix formed by the vanes permits the removal of the water freed from the agglomerates towards the top of the vessel whence it is removed through collector casing 22 and conduit 24. Preferably, the angles of inclination of the vanes diminish in a continuous manner from the upper to the lower part of the vessel.

In the illustrated embodiment, counter-vanes 30 are fixedly mounted on the interior wall of vessel 10. The counter-vanes could also be mounted on a rotary support and they are arranged in the vessel to cooperate with the vanes, the vanes and counter-vanes extending in substantially radial planes and being inclined with respect to each other, the inclinations of cooperating vanes and counter-vanes being in opposite directions.

The vanes and counter-vanes are formed of plain, imperforate elements with plane or shaped surfaces.

By adding the flocculating agent upstream of the thickening vessel proper, superflocculation is started and almost completed by the time the sludge enters the vessel in the upper third part thereof. The sludge may be fed to mixer 16 after pre-thickening by any suitable process, for instance by simple flocculation, or combined primary and secondary flocculation, with the use of natural or synthetic flocculating agents of an organic or inorganic nature, or a mixture thereof.

A discharge conduit 38 for the agglomerated product is disposed in lower part 10a of the vessel.

In a schematic manner, FIG. 2 illustrates the separation of the trapped water and the agglomerates forming the thickened sludge, which separation is obtained by the effect of stirring the mass between vanes 28 and counter-vanes 30, arrow 34 indicating the direction of flow taken by the liberated water and arrow 36 indicating the direction of flow of the sludge.

The operation of the illustrated apparatus will be self-evident from the described structure thereof. The mixture of flocculating agent and pre-thickened sludge is fed from mixer 16 tangentially into enlarged portion 14 of delivery conduit 12 whence it passes through outlet 12a into the upper part of vessel 10. The flocculated solids are decanted and their agglomeration or compaction is facilitated by the slow rotation of vanes 28 and their inclined position in a helix. The passage at the level of the counter-vanes causes the mass to be stirred in the course of agglomeration, which favors the liberation of entrained water which rises towards the peripheral collector 22.

It will be readily understood that the number of arms, vanes and counter-vanes may be varied in dependence on the dimension of the vessel and the vanes may be formed in a plurality of helices, with the same or different pitch. If the bottom of the vessel is flat, a scraping device or a horizontal screw conveyor must be installed to bring the thickened sludge to a central discharge conduit.

The superflocculating and thickening apparatus of this invention may be used in many industries for super-thickening after super-flocculation of sludges of organic or inorganic origin, whereever it is desired to save water or to obtain products which can be handled by trucks, cars, conveyor bands and, in particular, in installations for the wet treatment of ores and minerals.

What is claimed is:

1. An apparatus for superflocculating and thickening a sludge, which comprises
    (a) a cylindrical vessel having an upper part and a lower part,
    (b) an axially extending delivery conduit having an outlet in the upper third part of the vessel,
    (c) means for feeding a mixture of the sludge and of a flocculating agent to the delivery conduit whereby the mixture is delivered into the vessel through the delivery conduit outlet,
    (d) means for collecting liquid removed from the mixture delivered into the vessel and for discharging the removed liquid peripherally of the vessel at the upper part thereof,
    (e) a vertical rotary shaft extending through the vessel,
    (f) vanes mounted on the rotary shaft for rotation therewith,
    (g) counter-vanes arranged in the vessel to cooperate with the vanes,
        (1) the vanes and counter-vanes extending in substantially radial planes and being inclined with respect to each other, the inclinations of cooperating vanes and counter-vanes being in opposite directions, the vanes forming a discontinuous helix extending from the upper to the lower part of the vessel and the pitch of the helix diminishing towards the lower part of the vessel, and
    (h) a discharge conduit for the thickened sludge in the lower part of the vessel.
2. The apparatus of claim 1, wherein the lower part of the vessel comprises a conical bottom.
3. The apparatus of claim 1 or 2, wherein the counter-vanes are fixedly mounted on the interior wall of the vessel.
4. The apparatus of claim 1 or 2, wherein the angles of inclination of the vanes with respect to the horizontal are from 60° to 40° in the upper part and from 30° to 10° in the lower part of the vessel.
5. The apparatus of claim 4, wherein the angles of inclination diminish in a continuous manner from the upper to the lower part of the vessel.
6. The apparatus of claim 5, further comprising helically disposed arms supporting the vanes on the rotary shaft.
7. The apparatus of claim 6, wherein the angles of inclination of the counter-vanes with respect to the horizontal are from about 15° to about 35°.
8. The apparatus of claim 1 or 2, wherein the feeding means comprises a mixing device tangentially connected to the delivery conduit, the mixing device including an inlet for pre-thickened sludge and an inlet for the flocculating agent.

* * * * *